US008079520B2

(12) United States Patent
Lu et al.

(10) Patent No.: US 8,079,520 B2
(45) Date of Patent: Dec. 20, 2011

(54) METHOD FOR REDUCING RF INTERFERENCE INSIDE DUAL-INTERFACE CARD READER AND DUAL-INTERFACE CARD READER THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 286 days.

(21) Appl. No.: 12/465,140

(22) Filed: May 13, 2009

(65) Prior Publication Data
US 2009/0289117 A1    Nov. 26, 2009

(30) Foreign Application Priority Data

May 26, 2008    (CN) .......................... 2008 1 0112847

(51) Int. Cl.
*G06K 7/08*    (2006.01)
(52) U.S. Cl. ...................................................... 235/451
(58) Field of Classification Search .................. 235/451, 235/440, 441, 379, 380, 492, 375; 340/5.61, 340/5.74, 10.1, 572.1
See application file for complete search history.

(56) References Cited

U.S. PATENT DOCUMENTS

| | | | | |
|---|---|---|---|---|
| 5,382,781 | A * | 1/1995 | Inoue ............................. | 235/384 |
| 5,594,233 | A * | 1/1997 | Kenneth et al. ................. | 235/492 |
| 6,411,200 | B1 * | 6/2002 | Kawagishi ................. | 340/10.51 |
| 6,839,772 | B1 * | 1/2005 | Kowalski et al. ................. | 710/5 |
| 7,441,702 | B2 * | 10/2008 | Tadamasa ..................... | 235/449 |
| 7,506,814 | B2 * | 3/2009 | Nakabo et al. ................. | 235/451 |

FOREIGN PATENT DOCUMENTS

| | | |
|---|---|---|
| AU | 199923699 A1 * | 10/2000 |
| WO | WO-9746964 A1 | 12/1997 |

OTHER PUBLICATIONS

European Search Report dated Sep. 11, 2009 regarding Application No. EP 09305470.

* cited by examiner

*Primary Examiner* — Michael G Lee
*Assistant Examiner* — Suezu Ellis
(74) *Attorney, Agent, or Firm* — Harness, Dickey & Pierce, P.L.C.

(57) ABSTRACT

The present invention provides a method for reducing RF interference inside a dual-interface card reader and a dual-interface card reader, which relate to dual-interface card reader field. The method includes: adjusting RF power by the dual-interface card reader to reach a specified maximum value; determining the type of an IC card which is operating currently by the dual-interface card reader; if the IC card is a contactless IC card, responding to the contactless card and not responding to any contact IC card before the operation of the contactless IC card is completed by the dual-interface card reader; if the IC card is a contact IC card, adjusting the RF power so as to make the RF power to be lower and responding to the contact IC card by the dual-interface card reader, and if a contactless IC is operating before the operation of the contact IC card is completed, responding to the contactless IC card simultaneously by the dual-interface card reader. The dual-interface card reader includes: a determining module, a control module, a contact card communication module, a contactless card communication module and a data transferring module. The invention provides a solution for reducing RF interference inside a dual-interface card reader, which is implemented easily and conveniently. The identification effect of the dual-interface card reader is improved.

12 Claims, 3 Drawing Sheets

METHOD FOR REDUCING RF INTERFERENCE INSIDE DUAL-INTERFACE CARD READER AND DUAL-INTERFACE CARD READER THEREOF

This application claims priority to Chinese Patent Application No. 200810112847.3, entitled "Method for Reducing RF Interference inside Dual-Interface Card Reader and Dual-Interface Card Reader Thereof" and filed with the Chinese Patent Office on May 26, 2008, which is hereby incorporated by reference in its entirety.

FIELD OF THE INVENTION

The present invention relates to the field of dual-interface card reader, and more particularly, to a method for reducing RF interference inside a dual-interface card reader and a dual-interface card reader thereof.

BACKGROUND OF THE INVENTION

With many advantages as high security, large storage, and better portability, IC card is being used widely in many fields such as bank system, entrance guard system, bus charging system, computer, telecommunication, security etc. since the first IC card was born in the world, which makes people's life to become more convenient. The connection between IC card and people's social life becomes closer and closer and people keeps on requiring more from IC card in social life. Contact IC card has many disadvantages such as easily wear-out, usage limited by environment, which limit the usage of the contact IC card in many fields. The appearance of contactless (or non-contact) IC card solves the problem caused by the disadvantages of contact IC card and the requirement of the contactless IC card is increased.

Conventionally, the card readers for the two kinds of IC card are different. So two kinds of card readers were born: contact card reader and contactless (or non-contact) card reader. With the development of society and progress of technology, one kind of card reader can not satisfy requirement for read and write operation of both the two kinds of IC card. With the development of science and technology, a dual-interface card reader which can read both the contact IC card and contactless IC card appears. The dual-interface card reader provides at least one card reader socket for contact IC card and at least one antenna board for contactless IC card. Generally the hardware circuit of contact IC card reader socket is located in the RF magnetic field formed by the antenna board for contactless IC card (RF card), which makes the size of the card reader to be smaller. But when the dual-interface card reader is working, the magnetic field formed by the antenna board for contactless IC card will interfere the work of the hardware circuit of the contact IC card reader socket, which may cause the failure of identifying and operating contact IC card or decrease the successful rate of data interaction.

In order to reduce the RF interference inside the dual-interface card reader, the card reader applies two different kinds of operation modes: contact IC card reading mode and contactless IC card reading mode. The card reader chooses only one of the modes at a certain time, which avoids RF interference. But the card reader can not read a contact IC card and a contactless IC card simultaneously, which decreases the working efficiency of the dual-interface card reader. Especially in places where flow of reading card is large, the normal work and life of people will be influenced.

In addition, reducing of the RF interference can be implemented by extending the distance between the contact IC card socket and contactless IC card antenna board, which will make the size of the dual-interface card reader bigger. That brings much inconvenience for fixing a dual-interface card reader.

SUMMARY OF THE INVENTION

In order to reduce RF interference inside a dual-interface card reader effectively, the present invention provides a method for reducing RF interference inside a dual-interface card reader and a dual-interface card reader thereof. The solution is as follow:

A method for reducing RF interference inside a dual-interface card reader includes:

Adjusting RF power by the dual-interface card reader to reach a specified maximum value;

Determining a type of an IC card which is operating currently by the dual-interface card reader;

If the IC card is a contactless IC card, responding to the contactless card and not responding to any contact IC card before the operation of the contactless IC card is completed by the dual-interface card reader;

If the IC card is a contact IC card, adjusting the RF power so as to make the RF power to be lower and responding to the contact IC card by the dual-interface card reader, and if a contactless IC card is operating before the operation of the contact IC card is completed, responding to the contactless IC card simultaneously by the dual-interface card reader.

Adjusting the RF power by the dual-interface card reader includes:

Modifying a value of a register in a RF interface chip of the dual-interface card reader by the dual-interface card reader to change resistance value in RF interface chip.

After responding to the contactless IC card simultaneously by the dual-interface card reader, the method further includes:

adjusting RF power of the dual-interface card reader to the specified maximum value when the operations of both the contact IC card and the contactless IC card are completed.

A dual-interface card reader includes a determining module, a control module, a contact card communication module, a contactless card communication module and a data transferring module, in which:

the determining module is adapted to determine a type of an IC card which is operating currently;

The control module is adapted to adjust RF power to a specified maximum value when the dual-interface card reader is initialized; and if the determining module determines that the IC card which is operating currently is a contactless IC card, the control module is adapted to control the contactless card communication module to respond to the contactless IC card, and not to respond to any contact IC card before the operation of the contactless IC card is completed; and if the determining module determines that the IC card which is operating currently is a contact IC card, the control module is also adapted to adjust the RF power so as to make the RF power to be lower, and control the contact card communication module to respond to the contact IC card, and if a contactless IC card is operating before the operation of the contact IC card is completed, the control module is also adapted to control the contactless card communication module to respond to the contactless IC card simultaneously; and the control module is also adapted to control the data transferring module to communicate with other devices;

The contact card communication module is adapted to respond or not to respond to the contact IC card under control of the control module;

The contactless card communication module is adapted to respond to the contactless IC card under control of the control module;

The data transferring module is adapted to communicate with other devices under control of the control module.

The contactless card communication module includes a RF antenna and a RF interface chip, correspondingly, when adjusting the RF power, the control module is adapted to adjust a value of a register in the RF interface chip so as to change the RF power.

When the dual-interface card reader responds to the contact IC card and the contactless IC card simultaneously, the control module is further adapted to adjust the RF power to the specified maximum value after the operations of both the contact IC card and contactless IC card are completed.

At least one of those modules including determining module, the contact card communication module, the contactless card communication module and the data transferring module is integrated with the control module on a control chip.

The control module is a security chip, the security chip includes a smart card chip.

The contact card communication module includes a contact card responding unit adapted to respond to the contact IC card under control of the control module and a contact card socket.

The contact card responding unit includes a logic chip combination or an input/output interface.

The contact card socket includes a standard full-size card slot or a SIM card slot.

The present invention provides a solution for reducing RF interference inside a dual-interface card reader by adjusting RF power of the card reader, which is implemented easily and conveniently. Compared with the prior art, the dual-interface card reader can respond to a contact IC card and a contactless IC card simultaneously and the size of the card reader is not limited. The identification effect of the dual-interface card reader is improved and the failure of operating and identifying contact IC card is avoided.

DETAILED DESCRIPTION OF THE PREFERRED EMBODIMENTS

In order to make the purpose, technical solution and advantages clearer, the present invention is further described with the embodiments and the drawings below.

An embodiment of the present invention provides a method for reducing RF interference inside a dual-interface card reader, including adjusting RF power by the dual-interface card reader to reach a specified maximum value; determining the type of an IC card which is operating currently by the dual-interface card reader; If the IC card is a contactless IC card, responding to the contactless card and not responding to any contact IC card before the operation of the contactless IC card is completed by the dual-interface card reader; If the IC card is a contact IC card, adjusting the RF power so as to make the RF power to be lower and responding to the contact IC card by the dual-interface card reader, and if a contactless IC card is operating before the operation of the contact IC card is completed, responding to the contactless IC card simultaneously by the dual-interface card reader.

Embodiment 1

Figure 1:
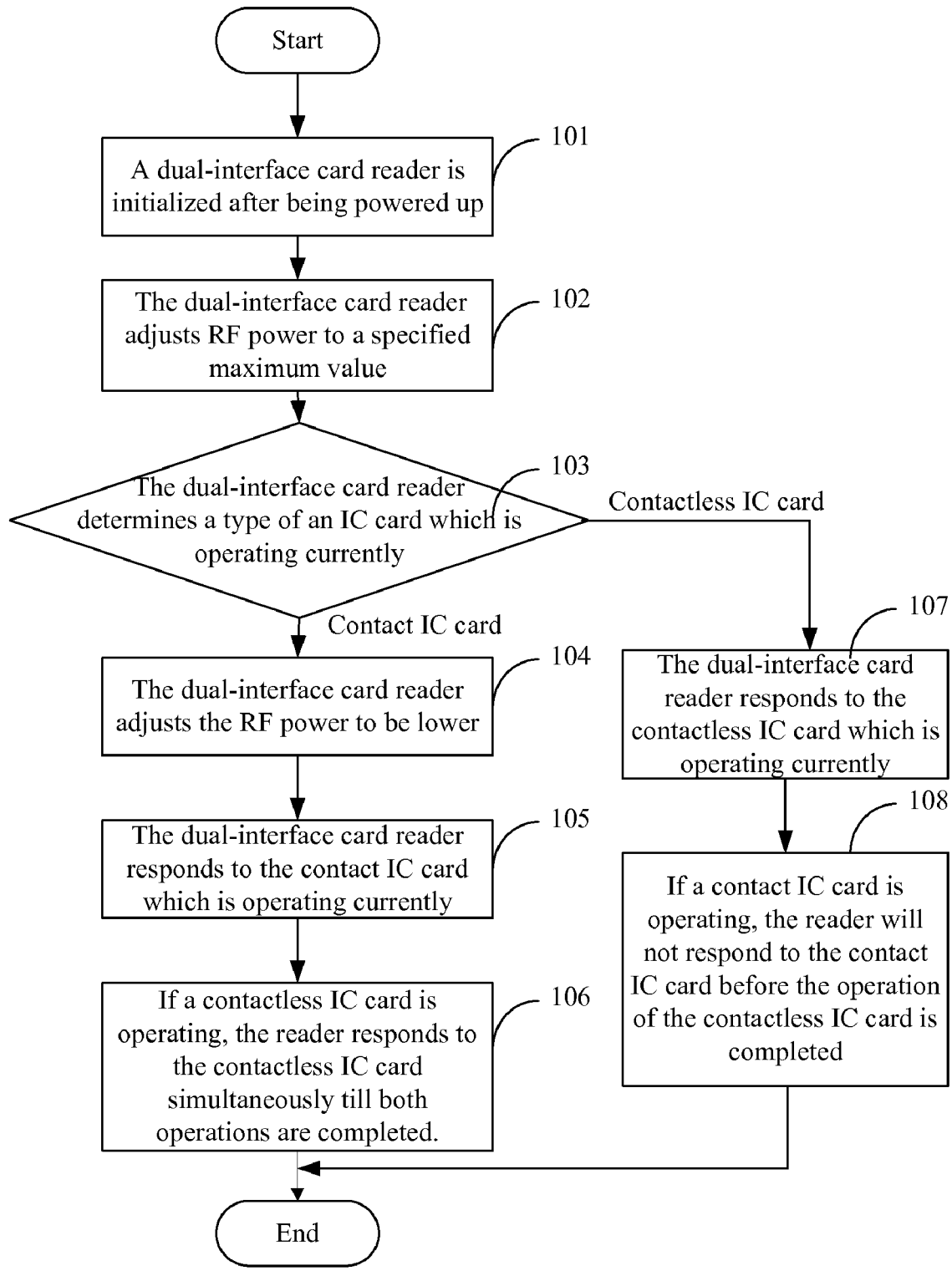
FIG. 1 is the flow chart of the method for reducing RF interference inside a dual-interface card reader provided in embodiment 1 of the present invention.

Referring to FIG. 1, an embodiment of the present invention provides a method for reducing RF interference inside a dual-interface card reader, including:

Step 101: the dual-interface card reader is initialized after being powered up;

Step 102: the dual-interface card reader adjusts RF power to a specified maximum value;

The specified maximum value refers to the value of RF power emitted by the dual-interface card reader when it has the best effect for reading a contactless IC card and the longest distance to the contactless IC card as well. A dual-interface card reader has its own specified maximum value which maybe different from those of other dual-interface card readers. Generally, the RF power is maximum at that time and the effective reading distance will be reduced if the RF power is reduced.

The dual-interface card reader modifies the value of a register in a RF interface chip to change resistance value of the RF interface chip, which makes value of RF power of the card reader to be changed. In the embodiment, preferably, the dual-interface card reader adopts a chip MFRC531. The value of a register in the chip can be changed to make the RF power emitted by the dual-interface card reader to be changed. When the dual-interface card reader is powered up, the initial value of the register in chip MFRC531 is set to 60 (according to the prior art, there is a value of the register corresponding to a value of RF power emitted by the dual-interface card reader when the card reader has the best effect for reading and the longest distance to a contactless IC card), correspondingly, the resistance value is 0.0117 ohm, and the RF power emitted by the dual-interface card is the RF power emitted at the time when the card reader has the best effect for reading the contactless IC card and the longest distance to the contactless IC card as well, correspondingly, the effective distance of the dual-interface card reader to respond to the contactless IC card is 5 cm.

Step 103: the dual-interface card reader determines the type of an IC card which is operating currently, if the IC card is a contact IC card, the process goes to step 104; if the IC card is a contactless IC card, the process goes to step 107;

Step 104: the dual-interface card reader adjusts the RF power to be lower;

The process of reducing the RF power can be implemented by modifying the value of a register in RF interface chip of the dual-interface card reader. Depending on the different registers, reducing of the RF power can be implemented by increasing or decreasing the value of the register. For example, the dual-interface card reader adjusts the value of a register in chip MFRC531 from initial value 60 to 7. Accordingly, the resistance value is increased from 0.0117 ohm to 0.1429 ohm. So the RF power of the dual-interface card reader is decreased when the resistance value is increased. Meanwhile, the RF field strength generated by the dual-interface card reader is reduced, which makes RF interference inside the card reader to be reduced. In this case, though the effective reading distance may be reduced, it will not affect performance of the card reader for reading a contactless IC card. In the present embodiment, the effective reading distance of the card reader for reading a contactless IC card is decreased to 3 cm. But that will not affect the dual-interface card reader to read a contactless IC card correctly.

Step 105: the dual-interface card reader responds to the contact IC card which is operating currently;

Step 106: if a contactless IC card is operating before the operation of the contact IC card is completed, the dual-interface card reader responds to both the contact IC card and the contactless IC card simultaneously till the operations of both the contactless IC card and the contact IC card are completed;

Further, the dual-interface card reader adjusts the RF power to the specified maximum value again, and the process of the method is ended. Or the dual-interface card reader keeps on detecting the type of an IC card which is operating, that is to say, go back to step 103.

During the process that the contact IC card and the contactless card are operating, the value of the register in the chip of the dual-interface card reader is constant and RF field strength of the dual-interface card reader keeps in a low field strength state all long. The dual-interface card reader adjusts the value of the register in chip MFRC531 from 7 to the initial value 60, which means that the resistance value is returned to 0.0117 ohm from 0.1429 ohm, after the operation of both the contact IC card and the contactless card are completed. Thereby, the RF power emitted by the card reader is increased and the RF field strength is returned to the specified maximum, and the effective reading distance returns to initial value 5 cm at that time.

Step 107: the dual-interface card reader responds to the contactless IC card which is operating currently.

Step 108: if a contact IC card is operating before the operation of the contactless IC card is completed, the dual-interface card reader will not respond to the contact IC card until the operation of the contactless card is completed. Then the process is ended (as shown in FIG. 1), or the dual-interface card reader keeps on detecting the type of an IC card which is operating, that is to say, go back to step 103;

In the present embodiment, generally, the dual-interface card reader transfers data read from the contact IC card or the contactless IC card to a computer or a device which is dedicated to communicate with the card reader. The computer or the device processes the received data and transfers a corresponding command and the processed data to the dual-interface card reader. And the dual-interface card reader transfers the received data or the command to the IC card.

Embodiment 2

Figure 2:
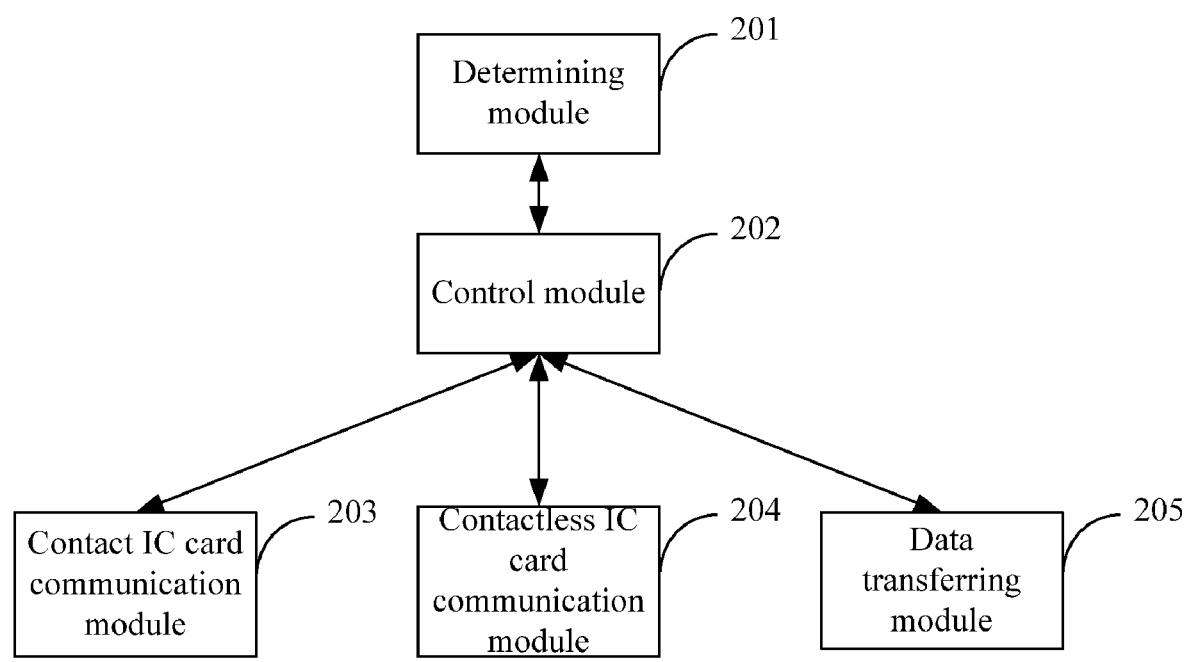
FIG. 2 is the structure diagram of a dual-interface card reader provided in embodiment 2 of the present invention.

Referring to FIG. 2, the present embodiment provides a dual-interface card reader including a determining module 201, a control module 202, a contact card communication module 203, a contactless card communication module 204 and a data transferring module 205, in which:

The determining module 201 is adapted to determine the type of an IC card which is operating currently;

The control module 202 is adapted to adjust RF power to a specified maximum value when the dual-interface card reader is initialized; and if the determining module 201 determines that the IC card which is operating currently is a contactless IC card, the control module 202 is adapted to control the contactless card communication module 204 to respond to the contactless IC card, and not to respond to any contact IC card before the operation of the contactless IC card is completed; and if the determining module 201 determines that the IC card which is operating currently is a contact IC card, the control module 202 is adapted to adjust RF power so as to make the RF power to be lower, and control the contact card communication module 203 to respond to the contact IC card, and if a contactless IC card is operating before the operation of the contact IC card is completed, the control module 202 is also adapted to control the contactless card communication module 204 to respond to the contactless IC card simultaneously; and the control module 202 is also adapted to control the data transferring module 205 to communicate with other devices;

The contact card communication module 203 is adapted to respond or not to respond to the contact IC card under control of the control module 202;

The contactless card communication module 204 is adapted to respond to the contactless IC card under control of the control module 202;

The data transferring module 205 is adapted to communicate with other devices under control of the control module 202.

In the present embodiment, the specified maximum value refers to the value of RF power emitted by the dual-interface card reader when it has the best effect for reading a contactless IC card and the longest distance to the contactless IC card.

Figure 3:
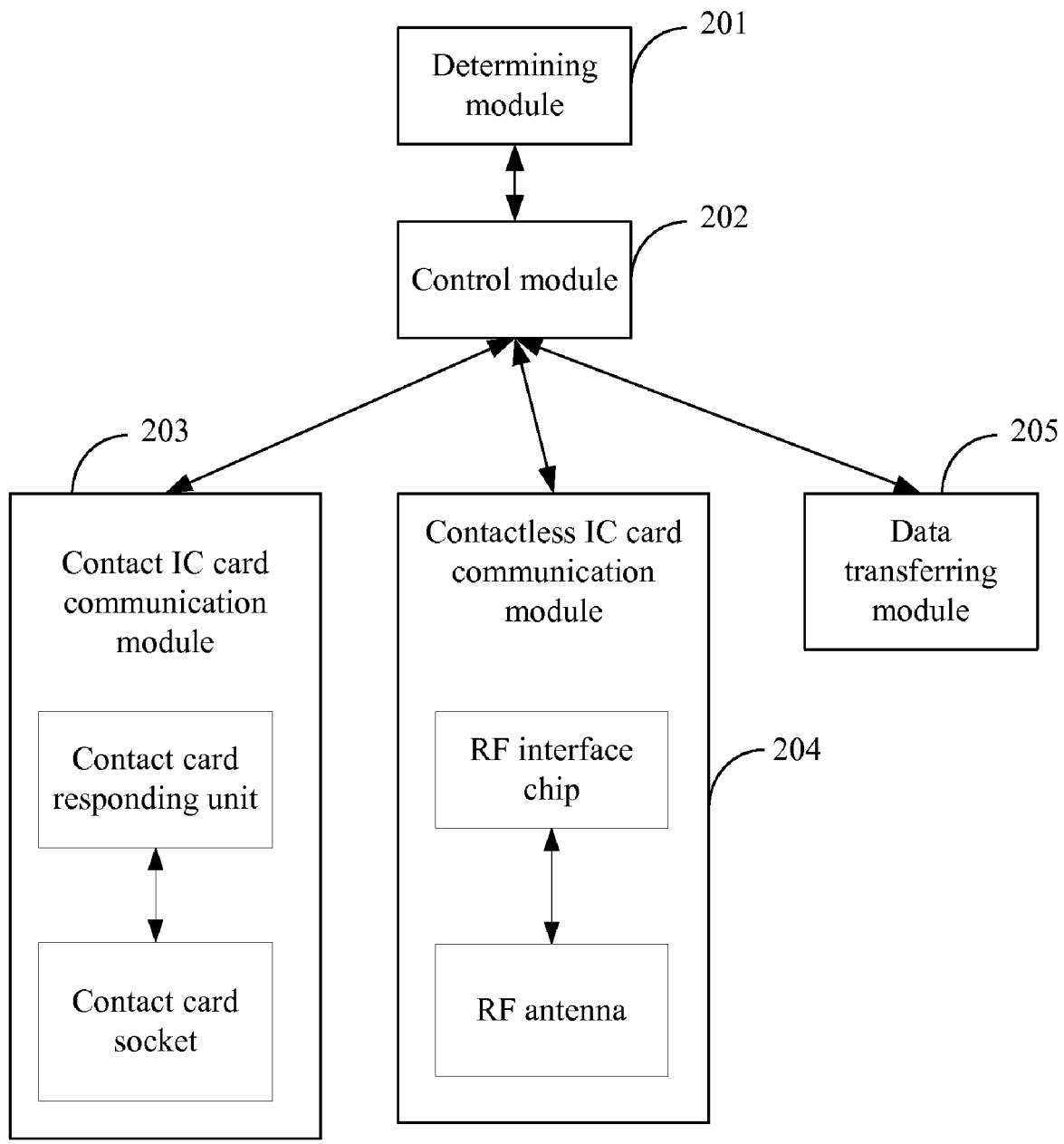
FIG. 3 is another structure diagram of a dual-interface card reader provided in embodiment 2 of the present invention.

Referring to FIG. 3, the contactless card communication module of the dual-interface card reader shown in FIG. 2 particularly includes a RF antenna and a RF interface chip. Correspondingly, when adjusting the RF power, the control module 202 is adapted to adjust a value of a register in the RF interface chip so as to change the RF power. The resistance in the RF interface chip is an adjustable resistance whose value can be changed by adjusting the value of the register.

Further, the control module 202 of the dual-interface card reader shown in FIG. 2 is also adapted, when the dual-interface card reader responds to both the contact IC card and the contactless IC card, to adjust the RF power to the specified maximum value after the operation of both the contact IC card and the contactless IC card are completed.

In this embodiment, the control module 202 can change the RF power of the dual-interface card reader by modifying the value of a register in the RF interface chip.

At least one of those modules including determining module 201, the contact card communication module 203, the contactless card communication module 204 and the data transferring module 205 is integrated with the control module 202 on a control chip.

The control module 202 is a security chip. The security chip includes a smart card chip.

Referring to FIG. 3, the contact card communication module 203 particularly includes a contact card responding unit adapted to respond to a contact IC card under control of the control module 202 and a contact card socket. Further, the contact card responding unit can be a logic chip combination or an input/output interface; The contact card socket can be a standard full-size card slot or a SIM card slot.

The device communicating with the dual-interface card reader via the data transferring module 205 can be a computer or other devices which are dedicated to communicate with the card reader. The data transferring module 205 can be implemented in many forms, which include but not limited to USB interface, serial interface, Bluetooth or infrared interface etc.

The embodiments of the present invention provides a solution for reducing RF interference inside a dual-interface card reader by adjusting RF power of the card reader. The purpose of changing the RF power of the dual-interface card reader can be achieved by adjusting the parameters of a register in the chip without changing the hardware of the external circuit of the chip, which is implemented easily and conveniently. Compared with the prior art, the dual-interface card reader can respond to a contact IC card and a contactless IC card simultaneously and the size of the card reader is not limited. The identification effect of the dual-interface card reader is improved and the failure of operating and identifying contact IC card is avoided.

The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

What is claimed is:

1. A method for reducing RF (Radio Frequency) interference inside a dual-interface card reader, comprising:
    adjusting RF power by the dual-interface card reader to reach a specified value;
    determining a type of an IC (integrated circuit) card which is operating currently by the dual-interface card reader;
    in response to a determination that the IC card is a contact IC card, adjusting the RF power so as to make the RF power to be lower and responding to the contact IC card by the dual-interface card reader and, additionally, when a contactless IC card is operating before the operation of the contact IC card is completed, responding to the contactless IC card simultaneously by the dual-interface card reader,
    wherein adjusting the RF power by the dual-interface card reader comprises: modifying a value of a register in a RF interface chip of the dual-interface card reader by the dual-interface card reader to change a resistance value in the RF interface chip.

2. According to the method of claim 1, wherein after responding to the contactless IC card simultaneously by the dual-interface card reader, the method further comprises:
    adjusting the RF power of the dual-interface card reader to the specified maximum value when the operations of both the contact IC card and the contactless IC card are completed.

3. According to the method of claim 1, wherein the specified value is the maximum value.

4. A dual-interface card reader, comprising a determining module, a control module, a contact card communication module, a contactless card communication module and a data transferring module, wherein:
    the determining module is adapted to determine a type of an IC (integrated circuit) card which is operating currently;
    the control module is adapted to adjust RF (Radio Frequency) power to a specified value when the dual-interface card reader is initialized; and the determining module determines that the IC card which is operating currently is a contact IC card, the control module is also adapted to adjust the RF power so as to make the RF power to be lower, and control the contact card communication module to respond to the contact IC card and, additionally, when a contactless IC card is operating before the operation of the contact IC card is completed, the control module is also adapted to control the contactless card communication module to respond to the contactless IC card simultaneously; and the control module is also adapted to control the data transferring module to communicate with other devices, wherein when adjusting the RF power, the control module is adapted to adjust a value of a register in a RF interface chip so as to change the RF power;
    the contact card communication module is adapted to respond or not to respond to the contact IC card under control of the control module;
    the contactless card communication module is adapted to respond to the contactless IC card under control of the control module;
    the data transferring module is adapted to communicate with other devices under control of the control module.

5. According to the dual-interface card reader of claim 4, wherein the contactless card communication module comprises a RF antenna and the RF interface chip.

6. According to the dual-interface card reader of claim 4, wherein when the dual-interface card reader responds to the contact IC card and the contactless IC card simultaneously, the control module is further adapted to adjust the RF power to the specified maximum value after the operations of both the contact IC card and contactless IC card are completed.

7. According to the dual-interface card reader of claim 4, wherein at least one of the determining module, the contact card communication module, the contactless card communication module and the data transferring module is integrated with the control module on a control chip.

8. According to the dual-interface card reader of claim 4, wherein the control module is a security chip, the security chip comprises a smart card chip.

9. According to the dual-interface card reader of claim 4, wherein the contact card communication module comprises both a contact card responding unit and a contact card socket, for adapting to respond to the contact IC card.

10. According to the dual-interface card reader of claim 9, wherein the contact card responding unit comprises a combination of more than one logic chip, or an input/output interface.

11. According to the dual-interface card reader of claim 9, wherein the contact card socket comprises a standard full-size card slot or a SIM card slot.

12. According to the dual-interface card reader of claim 4, wherein the specified value is the maximum value.

* * * * *